(12) United States Patent
Kuramoto et al.

(10) Patent No.: US 7,771,621 B2
(45) Date of Patent: Aug. 10, 2010

(54) SULFOSUCCINATE PROTONATED CONDUCTIVE POLYANILINE COMPOSITION, PROCESS FOR PRODUCING THE SAME, AND MOLDED OBJECT THEREOF

(75) Inventors: Noriyuki Kuramoto, Yonezawa (JP); Mizutomo Takeuchi, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 872 days.

(21) Appl. No.: 10/581,055

(22) PCT Filed: Nov. 25, 2004

(86) PCT No.: PCT/JP2004/017507

§ 371 (c)(1), (2), (4) Date: Dec. 18, 2006

(87) PCT Pub. No.: WO2005/052058

PCT Pub. Date: Jun. 9, 2005

(65) Prior Publication Data

US 2007/0108420 A1      May 17, 2007

(30) Foreign Application Priority Data

Nov. 28, 2003   (JP)   .............................. 2003-399286

(51) Int. Cl.
*H01B 1/12* (2006.01)
*B05D 5/12* (2006.01)

(52) U.S. Cl. ..................... 252/500; 427/58; 528/210; 528/422

(58) Field of Classification Search ................. 252/500; 528/210, 422; 427/58
See application file for complete search history.

(56) References Cited

U.S. PATENT DOCUMENTS

| | | | |
|---|---|---|---|
| 5,670,607 A | 9/1997 | Chen | |
| 5,772,923 A * | 6/1998 | Levon | ........................ 252/500 |
| 5,773,568 A * | 6/1998 | MacDiarmid et al. | ........ 528/495 |
| 5,780,572 A * | 7/1998 | Graham | ....................... 528/210 |
| 6,752,935 B2 * | 6/2004 | Angelopoulos et al. | ...... 252/500 |
| 7,014,794 B1 * | 3/2006 | Olinga et al. | ................ 252/500 |
| 2003/0091845 A1 | 5/2003 | Pron et al. | |
| 2009/0035532 A1 * | 2/2009 | Bando et al. | .............. 428/195.1 |

FOREIGN PATENT DOCUMENTS

JP      62 149724      7/1987

(Continued)

OTHER PUBLICATIONS

Cao et al "Efect of Solvents and Co-solvents on the Processibility of Polyaniline . . . ", Synthetic Metals 69 (1995) 187-190.*

(Continued)

*Primary Examiner*—Mark Kopec
(74) *Attorney, Agent, or Firm*—Oblon, Spivak, McClelland, Maier & Neustadt, L.L.P.

(57) ABSTRACT

A conductive polyaniline composition of a substituted or unsubstituted polyaniline complex and a compound with a phenolic hydroxyl group dissolved in an organic solvent substantially immiscible with water that is capable of producing a molded article possessing high conductivity.

20 Claims, 2 Drawing Sheets

FOREIGN PATENT DOCUMENTS

| | | |
|---|---|---|
| JP | 6 508390 | 9/1994 |
| JP | 7 70312 | 3/1995 |
| JP | 7 126384 | 5/1995 |
| JP | 10 7795 | 1/1998 |
| JP | 2001 512758 | 8/2001 |
| JP | 2001 288264 | 10/2001 |
| JP | 2003 183389 | 7/2003 |
| WO | WO 02/10251 A1 | 2/2002 |
| JP | 62 230825 | 10/1987 |
| JP | 1 131237 | 5/1989 |

OTHER PUBLICATIONS

Geng et al "Solution Properites of doped polyaniline", Journal of Macromolecular Science. Physics, 1997 vol. 36, No. 1 125-135 (Abstract Only).*

Adams et al., "A New Acid-Processing Route to Polyaniline Films Which Exhibit Metallic Conductivity and Electrical Transport Strongly Dependent Upon Intrachain Molecular Dynamics", Journal of Physics-Condensed Matter, vol. 10, No. 36, pp. 8293-8303, 1998.

Cao et al., "Counter-Ion Induced Processibility of Conducting Polyaniline and of Conducting Polyblends of Polyaniline in Bulk Polymers", Synthetic Metals, vol. 48, No. 1, pp. 91-97, 1992.

* cited by examiner

SULFOSUCCINATE PROTONATED CONDUCTIVE POLYANILINE COMPOSITION, PROCESS FOR PRODUCING THE SAME, AND MOLDED OBJECT THEREOF

TECHNICAL FIELD

The invention relates to a conductive polymer composition which can be easily produced and handled and capable of producing a molded article possessing extremely excellent electrical characteristics, particularly to a highly conductive protonated polyaniline-based composition, and a method for producing a soluble and protonated polyaniline-based complex.

BACKGROUND ART

Polyaniline is a well-known material of conductive polymers. In addition to the electric characteristics, polyaniline has advantages and characteristics of being synthesized by a comparatively simple process from an inexpensive raw material of aniline and possessing excellent stability in the air and the like, while exhibiting conductivity.

As a method for producing polyaniline, a method of polymerizing aniline or aniline derivatives by electrolytic oxidation or chemical oxidation has been known.

As the electrolytic-oxidation polymerization, methods of obtaining polyaniline on electrodes are described in JP-A-62-230825 and JP-A-62-149724. Although films with excellent electrical characteristics and the like can be obtained by electrolytic-oxidation polymerization, electrolytic-oxidation polymerization is generally more expensive than chemical-oxidation polymerization, is unsuitable for large-scale production, and involves difficulty in obtaining molded articles with a complicated shape.

On the other hand, in order to obtain a conductive polymer of aniline or aniline derivatives by chemical-oxidation polymerization, a step for protonating polyaniline, which is generally obtained in the state of a non-conductive base (so-called emeraldine base), by adding a dopant (doping agent) is necessary. However, since polyaniline in the state of a non-conductive base only scarcely dissolves in most organic solvents, the method is not suitable for industrial production. In addition, conductive polyaniline (in the state of a so-called emeraldine salt) produced after protonation is substantially infusible. It is difficult to manufacture a conductive composite material and its molded article in a simple manner from such a conductive polyaniline.

Several methods have been proposed for improving doping of polyaniline in the non-conductive base state and affinity of conductive polyaniline after doping with organic solvents.

Synthetic Metals, vol. 48, pp 91-97 (1992), for example, describes the use of proton acids having affinity with organic solvents such as dodecylbenzenesulfonic acid and camphorsulfonic acid (CSA) as dopants and their outstanding electrical characteristics.

JP-A-7-70312 discloses a method of doping polyaniline in a non-conductive base state using a damantane sulfonic acid dissolved in m-cresol as a dopant.

J. Phys.: Condens. Matter, vol. 10, pp 8293-8303 (1998) describes a method of doping polyaniline in a non-conductive base state using 2-acrylamide-2-methyl-propanesulfonic acid in a specific solvent (halogen-containing strong acid) such as 2,2-dichloroacetic acid, for example, as a dopant.

JP-A-2003-183389 describes, in the same manner as JP-A-62-149724, for example, a method of doping polyaniline in a non-conductive base state using 2,2-dichloroacetic acid as a solvent and di(2-ethylhexyl) sulfosuccinate as a dopant.

All of the methods described in the above-mentioned documents cannot be referred to as simple methods for producing conductive polyaniline because of inclusion of a step of doping polyaniline in the non-conductive base state. Moreover, molded articles made from these conductive polyanilines do not necessarily possess excellent electrical characteristics such as electric conductivity.

In view of the above situation, the invention has an object of providing a conductive polyaniline composition capable of producing a molded article possessing high conductivity, and a method for producing a conductive polyaniline complex and a composition comprising the same without producing polyaniline in a non-conductive base state.

DISCLOSURE OF THE INVENTION

As a result of extensive studies to achieve the above object, the present inventors have found that a complex (a so-called emeraldine salt) of polyaniline and the above-mentioned protonic acid can be formed by polymerizing aniline in the presence of a protonic acid having a specific structure in a two-layer system of an organic solvent such as toluene and water. The inventors have found that this complex is soluble in the above-mentioned organic solvent and that the above-mentioned organic solvent phase can be homogeneously applied to a substrate such as glass.

In addition, in the complex (so-called emeraldine salt) of polyaniline and a protonic acid having a specific structure obtained by polymerizing aniline in the presence of the protonic acid in a two-layer system of an organic solvent such as toluene and water, the molecular weight of the polyaniline can be changed as desired. Surprisingly, it was found that polyaniline with a very large molecular weight can be produced, in spite of its properties of being dissolvable in solvents such as toluene.

Furthermore, the inventors of the invention have found that the molded article of the conductive polyaniline composition obtained by applying a composition, which is prepared by adding a small amount of a compound having a phenolic hydroxyl group to the complex of polyaniline and protonic acid dissolved in the above-mentioned organic solvent, to a substrate such as glass exhibits outstandingly improved electrical characteristics such as electric conductivity. In addition, a composition to which a small amount of a compound having a phenolic hydroxyl group is added can be formed into a conductive article with very high transparency due to its homogeneity.

It has been known in the above-mentioned Synthetic Metals, vol. 48, pp 91-97 (1992) that a conductive polyaniline (so-called emeraldine salt) produced by doping a non-conductive polyaniline (so-called emeraldine base) with dodecylbenzenesulfonic acid, camphorsulfonic acid (CSA), or the like using a compound having a phenolic hydroxyl group, particularly m-cresol as a solvent, exhibits high conductivity. However, because this compound having a phenolichydroxyl group is a solvent and the conductive polyaniline has a low solubility, a large amount of a compound having a phenolic hydroxyl group is required to produce a conductive material. Since the compound having phenolic hydroxyl group such as m-cresol has a high boiling point, a large amount of energy is required to produce a solid or a material. Since only a small amount of the compound with a phenolic hydroxyl group is used in the composition of the invention, it is not difficult to remove a large part of volatile solvents such as toluene.

In addition, the inventors of the invention have found that when an excessive amount of a compound having a phenolic hydroxyl group is used in the composition of the invention, the composition has a low solubility and cannot produce a homogeneous solution, resulting in decreased electric conductivity. Based on this finding, the inventors have found that appropriate adjustment of the concentration is necessary, leading to the completion of the invention.

According to the invention, the following conductive polyaniline compositions are provided.

(1) A conductive polyaniline composition comprising:

(a) a protonated substituted or unsubstituted polyaniline complex, and (b) a compound having a phenolic hydroxyl group, (a) and (b) being dissolved in an organic solvent substantially immiscible with water.

(2) The conductive polyaniline composition according to (1), wherein the substituted or unsubstituted polyaniline is a high-molecular weight component having a weight average molecular weight of 100,000 g/mol or more.

(3) The conductive polyaniline composition according to (1) or (2), wherein the molar concentration of the compound (b) having a phenolic hydroxyl group in the total solution of the composition is 0.01 mol/l to 5 mol/l.

(4) The conductive polyaniline composition according to any one of (1) to (3), wherein the concentration of the protonated substituted or unsubstituted polyaniline complex (a) relative to the organic solvent is 0.01 to 300 g/l.

(5) The conductive polyaniline composition according to any one of (1) to (4), wherein the content of a substituted or unsubstituted polyaniline relative to the protonated substituted or unsubstituted polyaniline complex (a) is 20 wt % to 70 wt %.

(6) The conductive polyaniline composition according to any one of (1) to (5), wherein the protonated substituted or unsubstituted polyaniline complex (a) is a substituted or unsubstituted polyaniline protonated by an organic protonic acid or a salt thereof represented by the following formula (I), $$M(XARn)m \quad (I)$$

wherein M is a hydrogen atom, or an organic or inorganic free radical;

X is an acidic group;

A is a hydrocarbon group which may have a substituent;

R is independently —$R^1$, —$OR^1$, —$COR^1$, —$COOR^1$, —CO(COR$^1$), or —CO(COOR$^1$) (wherein $R^1$ is a hydrocarbon group with 4 or more carbon atoms which may have a substituent, silyl group, alkylsilyl group, —$(R^2O)_x$—$R^3$, or —$(OSiR^3{}_2)_x$—$OR^3$ (wherein $R^2$ is an alkylene group, $R^3$ is a hydrocarbon group ($R^3$s may be the same or different), and x is an integer of 1 or more));

n is an integer of 2 or more; and m is a valence of M.

(7) The conductive polyaniline composition according to (6), wherein the organic protonic acid or the salt thereof represented by the formula (I) is a compound represented by the following formula (II), $$M(XCR^4(CR^5{}_2COOR^6)COOR^7)_p \quad (II)$$

wherein M is a hydrogen atom, or an organic or inorganic free radical;

X is an acidic group;

$R^4$ and $R^5$ are independently a hydrogen atom, hydrocarbon group, or $R^8{}_3Si$— (wherein $R^8$ is a hydrocarbon group (three $R^8$s may be the same or different));

$R^6$ and $R^7$ are independently a hydrocarbon group or —$(R^9O)_q$—$R^{10}$ (wherein $R^9$ is a hydrocarbon group or silylene group, $R^{10}$ is a hydrogen atom, hydrocarbon group, or $R^{11}{}_3Si$— (wherein $R^{11}$ is a hydrocarbon group (three $R^{11}$s may be the same or different)), and q is an integer of 1 or more); and p is a valence of M.

(8) The conductive polyaniline composition according to (7), wherein the organic protonic acid or the salt thereof represented by the formula (II) is a sulfosuccinate derivative represented by the following formula (III), $$M(O_3SCH(CH_2COOR^{12})COOR^{13})_m \quad (III)$$

wherein M is a hydrogen atom, or an organic or inorganic free radical;

$R^{12}$ and $R^{12}$ are independently a hydrocarbon group or —$(R^{14}O)_r$—$R^{15}$ (wherein $R^{14}$ is a hydrocarbon group or silylene group, $R^{15}$ is a hydrogen atom, hydrocarbon group, or $R^{16}{}_3Si$— (wherein $R^{16}$ is a hydrocarbon group (three $R^{16}$s may be the same or different)), and r is an integer of 1 or more); and m is a valence of M.

(9) The conductive polyaniline composition according to any one of (6) to (8), wherein the protonated substituted or unsubstituted polyaniline complex (a) is obtained by chemical-oxidation polymerizing a substituted or unsubstituted aniline which contains the protonic acid or salt thereof represented by the formulas (I) to (III).

(10) A method for producing a protonated substituted or unsubstituted polyaniline, comprising chemical-oxidation polymerizing a substituted or unsubstituted aniline in a two-phase system of an aqueous solution and an organic solvent substantially immiscible with water to produce a protonated substituted or unsubstituted polyaniline complex soluble in the organic solvent substantially immiscible with water, the system containing an organic protonic acid or a salt thereof represented by the following formula (I), $$M(XARn)m \quad (I)$$

wherein M is a hydrogen atom, or an organic or inorganic free radical;

X is an acidic group;

A is a hydrocarbon group which may have a substituent;

R is independently —$R^1$, —$OR^1$, —$COR^1$, —$COOR^1$, —CO(COR$^1$), or —CO(COOR$^1$) (wherein $R^1$ is a hydrocarbon group with 4 or more carbon atoms which may have a substituent, silyl group, alkylsilyl group, —$(R^2O)_x$—$R^3$, or —$(OSiR^3{}_2)_x$—$OR^3$ (wherein $R^2$ is an alkylene group, $R^3$ is a hydrocarbon group ($R^3$s may be the same or different), and x is an integer of 1 or more));

n is an integer of 2 or more; and m is a valence of M.

(11) The method according to (10), wherein the organic protonic acid or the salt thereof represented by the formula (I) is a compound represented by the following formula (II), $$M(XCR^4(CR^5{}_2COOR^6)COOR^7)_p \quad (II)$$

wherein M is a hydrogen atom, or an organic or inorganic free radical;

X is an acidic group;

$R^4$ and $R^5$ are independently a hydrogen atom, hydrocarbon group, or $R^8{}_3Si$— (wherein $R^8$ is a hydrocarbon group (three $R^8$s may be the same or different));

$R^6$ and $R^7$ are independently a hydrocarbon group or —$(R^9O)_q$—$R^{10}$ (wherein $R^9$ is a hydrocarbon group or silylene group, $R^{10}$ is a hydrogen atom, hydrocarbon group, or $R^{11}{}_3Si$— (wherein $R^{11}$ is a hydrocarbon group (three $R^{11}$s may be the same or different)), and q is an integer of 1 or more); and p is a valence of M.

(12) The method according to (11), wherein the organic protonic acid or the salt thereof represented by the formula (II) is a sulfosuccinate derivative represented by the following formula (III), $$M(O_3SCH(CH_2COOR^{12})COOR^{13})_m \quad (III)$$

wherein M is a hydrogen atom, or an organic or inorganic free radical;

$R^{12}$ and $R^{13}$ are independently a hydrocarbon group or —$(R^{14}O)_r$—$R^{15}$ (wherein $R^{14}$ is a hydrocarbon group or silylene group, $R^{15}$ is a hydrogen atom, hydrocarbon group, or $R^{16}{}_3Si$— (wherein $R^{16}$ is a hydrocarbon group (three $R^{16}$s may be the same or different)), and r is an integer of 1 or more); and m is a valence of M.

(13) The conductive polyaniline composition according to any one of (1) to (5), wherein the protonated substituted or unsubstituted polyaniline complex (a) is obtained by the method of any one of (10) to (12).

(14) The conductive polyaniline composition according to any one of (1) to (9) and (13), wherein the compound (b) having a phenolic hydroxyl group is selected from the group consisting of phenol, o-, m-, or p-cresol, catechol, resorcinol, chlorophenol, salicylic acid, hydroxybenzoic acid, hydroxynaphthalene, phenol resins, polyphenol, and poly(hydroxystyrene).

(15) The conductive polyaniline composition according to (1) to (9), (13), and (14), wherein the organic solvent substantially immiscible with water is selected from the group consisting of hydrocarbon solvents such as benzene, toluene, xylene, ethylbenzene, and tetralin; halogen-containing solvents such as methylene chloride, chloroform, carbon tetrachloride, dichloroethane, trichloroethane, and tetrachloroethane; and ester solvents such as ethyl acetate.

(16) A method for producing a conductive polyaniline composition comprising the steps of:

(i) chemical-oxidation polymerizing a substituted or unsubstituted aniline in an organic solvent substantially immiscible with water in the presence of an organic protonic acid or a salt thereof represented by the following formula (I) to produce a protonated substituted or unsubstituted polyaniline complex (a) soluble in the organic solvent, $$M(XARn)m \quad (I)$$

wherein M is a hydrogen atom, or an organic or inorganic free radical;

X is an acidic group;

A is a hydrocarbon group which may have a substituent;

R is independently —$R^1$, —$OR^1$, —$COR^1$, —$COOR^1$, —$CO(COR^1)$, or —$CO(COOR^1)$ (wherein $R^1$ is a hydrocarbon group with 4 or more carbon atoms which may have a substituent, silyl group, alkylsilyl group, —$(R^2O)_x$—$R^3$, or —$(OSiR^3{}_2)$—$OR^3$ (wherein $R^2$ is an alkylene group, $R^3$ is a hydrocarbon group ($R^3$s may be the same or different), and x is an integer of 1 or more));

n is an integer of 2 or more; and m is a valence of M; and (ii) adding a compound (b) having a phenolichydroxyl group into the protonated substituted or unsubstituted polyaniline complex (a) dissolved in the organic solvent substantially immiscible with water.

(17) The method according to (16), wherein the organic protonic acid or the salt thereof represented by the formula (I) is an organic protonic acid or the salt thereof represented by the following formula (II), $$M(XCR^4(CR^5{}_2COOR^6)COOR^7)_p \quad (II)$$

wherein M is a hydrogen atom, or an organic or inorganic free radical;

X is an acidic group;

$R^4$ and $R^5$ are independently a hydrogen atom, hydrocarbon group, or $R^8{}_3Si$— (wherein $R^8$ is a hydrocarbon group (three $R^8$s may be the same or different));

$R^6$ and $R^7$ are independently a hydrocarbon group or —$(R^9O)_q$—$R^{10}$ (wherein $R^9$ is a hydrocarbon group or silylene group, $R^{10}$ is a hydrogen atom, hydrocarbon group, or $R^{11}{}_3Si$— (wherein $R^{11}$ is a hydrocarbon group (three $R^{11}$s may be the same or different)), and q is an integer of 1 or more); and p is a valence of M.

(18) A conductive molded article obtainable by forming the conductive polyaniline composition according to any one of (1) to (9) and (13) to (15).

(19) The conductive molded article according to (18) whose inherent conductivity is at least 50 S/cm.

(20) A surface-electric-conductive product obtainable by applying the conductive polyaniline composition according to any one of (1) to (9) and (13) to (15), to a substrate.

(21) The surface-electric-conductive product according to (20) whose specific surface resistance is at most $10^5$ Ω.

(22) The transparent surface-electric-conductive product according to (21) whose light transmission is 70% or more at 450 nm.

(23) A method for producing a surface-electric-conductive product comprising: applying the conductive polyaniline composition according to any one of (1) to (9) and (13) to (15), to a substrate, and forming the applied substrate.

A conductive polyaniline molded article excelling in electric characteristics, homogeneity, and transparency can be obtained according to the invention.

Because the conductive polyaniline composition of the invention is obtained in a state of being dissolved in an organic solvent after aniline polymerization without producing a non-conductive polyaniline (in the state of a so-called emeraldine base), the post-treatment after polymerization can be simplified and complicated steps requiring a long period of time such as doping are unnecessary. Thus, an extremely advantageous process for producing a conductive polyaniline composition that can be applied in industrial manufacturing is provided.

If desired, a conductive polyaniline complex having an unprecedentedly large molecular weight and being soluble in organic solvents can be obtained. If polyaniline has a large molecular weight, conductive articles with a high strength and high ductility can be obtained from such polyaniline.

According to the invention, electric conductivity can be remarkably increased by adding a compound having a phenolic hydroxyl group as a second dopant.

Since the conductive polyaniline composition of the invention is dissolved in an organic solvent in a conductive state (in a protonated state), the composition can be easily formed into a membrane or film. The resulting molded articles, membranes, and films excel in homogeneity and transparency and exhibit very high electric conductivity even when not processed by drawing or the like.

The conductive polyaniline composition of the invention can be produced easily and economically using an inexpensive raw material and common equipment and is industrially very useful.

BEST MODE FOR CARRYING OUT THE INVENTION

The invention will be described in detail below. The conductive polyaniline composition of the invention (hereinafter referred to as "composition of the invention") comprises (a) a protonated substituted or unsubstituted polyaniline complex and (b) a compound having a phenolic hydroxyl group, which are dissolved in an organic solvent substantially immiscible with water.

The conductive polyaniline composition of the invention is preferably produced by a process comprising the steps of: (i) polymerizing a substituted or unsubstituted aniline by chemical oxidation in an organic solvent substantially immiscible with water in the presence of an organic protonic acid or a salt thereof represented by the following formula (I) to produce a protonated substituted or unsubstituted polyaniline complex (a) soluble in the organic solvent,

$$M(XARn)m \tag{I}$$

wherein M is a hydrogen atom, or an organic or inorganic free radical;
X is an acidic group;
A is a hydrocarbon group which may have a substituent;
R is independently —$R^1$, —$OR^1$, —$COR^1$, —$COOR^1$, —CO($COR^1$), or —CO($COOR^1$) (wherein $R^1$ is a hydrocarbon group with 4 or more carbon atoms which may have a substituent, silyl group, alkylsilyl group, —$(R^2O)_x$—$R^3$, or —$(OSiR^3{}_2)_x$—$OR^3$ (wherein $R^2$ is an alkylene group, $R^3$ is a hydrocarbon group ($R^3$s may be the same or different), and x is an integer of 1 or more));
n is an integer of 2 or more; and
m is a valence of M, and (ii) adding a compound (b) having a phenolic hydroxyl group into the protonated substituted or unsubstituted polyaniline complex (a) dissolved in the organic solvent substantially immiscible with water.

The compound (b) having a phenolic hydroxyl group (hereinafter referred to as "phenolic compound (b)") used in the composition of the invention is not specifically limited and is shown by the general formula of ArOH (wherein Ar is an aryl group or a substituted aryl group). Specific examples include phenol; substituted phenols such as o-, m-, or p-cresol, o-, m-, or p-ethylphenol, o-, m-, or p-propylphenol, o-, m-, or p-butylphenol, o-, m-, or p-chlorophenol, salicylic acid, hydroxybenzoic acid, and hydroxynaphthalene; polyphenolic compounds such as catechol and resorcinol; and polymers such as phenol resins, polyphenol, and poly(hydroxystyrene).

Figure 1:
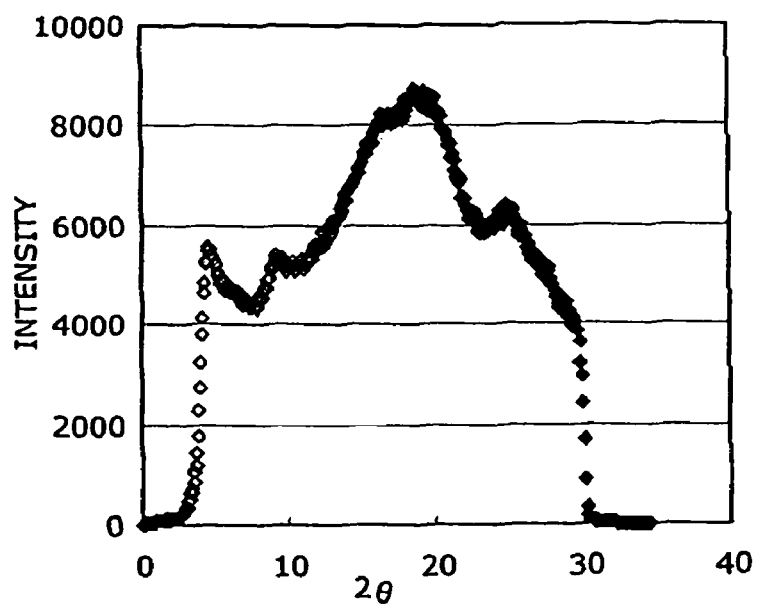
FIG. 1 is a wide angle X-ray dispersion spectrum of a formed article (membrane) produced from the composition of the invention containing a phenolic compound (b).
Figure 2:
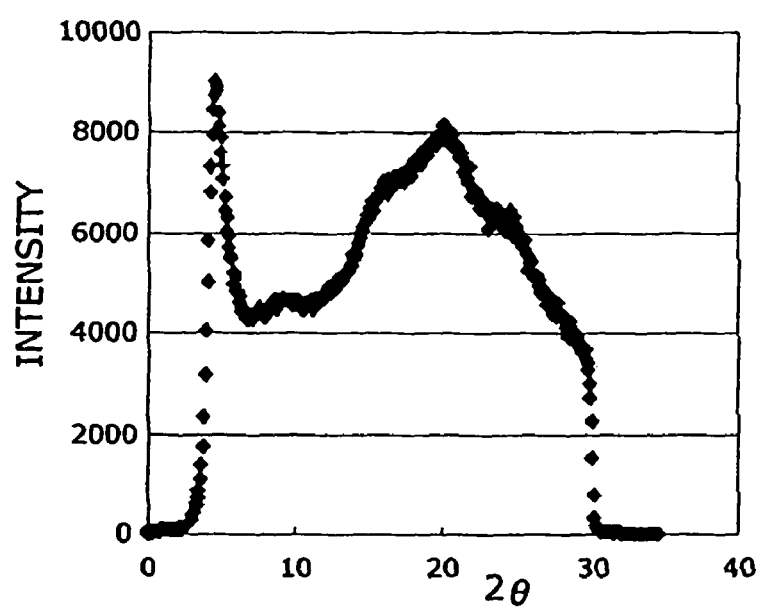
FIG. 2 is a wide angle X-ray dispersion spectrum of a formed article (membrane) produced from a polyaniline complex (a) dissolved in an organic solvent not containing a phenolic compound (b).

In the composition of the invention, the phenolic compound (b) is present as a dopant, not as a solvent. The phenolic compound (b) of being a dopant is supported by the fact that (1) the molded articles prepared from the composition of the invention containing the phenolic compounds (b) have very high electric conductivity as compared with molded articles prepared from a composition not containing the phenolic compounds (b) (refer to Examples and Comparative Examples) and (2) as shown in FIGS. 1 and 2, the molded articles prepared from the composition of the invention containing the phenolic compounds (b) (Example 7) and the molded articles prepared from a polyaniline composition not containing the phenolic compounds (b) (Comparative Example 3) after removing an organic solvent are identified by a UV-vis (ultraviolet-visible ray) spectrum differing from each other. It is clear that the phenolic compounds (b) remain in the molded articles after removing the solvent. Specifically, if the phenolic compound (b) is a solvent, the phenolic compound is easily vaporized with heat and removed when a molded product is produced. However, if present as a dopant, the phenolic compound (b) is electrically charged and a great amount of energy is required to remove the phenolic compound from polyaniline. Heating of a degree usually used for vaporizing a phenolic compound cannot remove such a phenolic compound.

The amount of the phenolic compound (b) added to the composition of the invention is in a range usually from 0.01 to 1,000 mass %, and preferably from 0.5 to 500 mass % for the protonated substituted or unsubstituted polyaniline complex (a).

The molar concentration of the compound (b) having a phenolic hydroxyl group in the total composition is preferably in a range from 0.01 mol/l to 5 mol/l. If the amount of the compound is too small, improvement in electric conductivity may not be achieved. An excessive amount may impair homogeneity of the composition and require a large amount of heat and man-hours for volatilization removal, possibly resulting in a material with impaired transparency and electric characteristics.

In the protonated substituted or unsubstituted polyaniline complex (a) (hereinafter referred to simply as "polyaniline complex") used in the composition of the invention, the substituted or unsubstituted polyaniline (hereinafter referred to simply as "polyaniline") is preferably protonated by an organic protonic acid or a salt thereof represented by the following formula (I) (hereinafter referred to as "organic protonic acid (I) or a salt thereof).

$$M(XARn)m \tag{I}$$

As examples of the substituent for the substituted polyaniline, linear or branched hydrocarbon groups such as a methyl group, ethyl group, hexyl group, and octyl group; alkoxyl groups such as a methoxy group and phenoxy group; aryloxy groups; and halogen-containing hydrocarbon groups such as $CF_3$ group can be given.

The substituted or unsubstituted polyaniline in the invention is preferably a high molecular weight component having a weight average molecular weight of 100,000 g/mol or more. The use of such a high molecular weight component can improve strength and ductility of conductive products produced from the composition.

The molecular weight of polyaniline is measured by gel permeation chromatography (GPC). Details of measurement will be described later in the examples.

In the above formula (I), M is a hydrogen atom, or an organic or inorganic free radical. As examples of the organic free radical, a pyridinium group, imidazolium group, and anilinium group can be given. As examples of the inorganic free radial, sodium, lithium, potassium, cerium, and ammonium can be given.

X is an acidic group, for example, an $-SO_3^-$ group, $-PO_3^{2-}$ group, $-PO_4(OH)^-$ group, $-OPO_3^{2-}$ group, $-OPO_2(OH)^-$ group, and $-COO^-$ group, with the $-SO_3^-$ group being preferable.

A is a hydrocarbon group which may be substituted. Examples thereof include linear or branched alkyl or alkenyl groups having 1 to 24 carbon atoms, cycloalkyl groups which may be substituted such as cyclopentyl, cyclohexyl, cycloheptyl, cyclooctyl, and menthyl; dicycloalkyl groups or polycycloalkyl groups which may be condensed such as bicyclohexyl, norbornyl, and adamantly; aryl groups including an aromatic ring which may be substituted such as phenyl, tosyl, thiophenyl, pyrrolinyl, pyridinyl, and furanyl; diaryl groups or polyaryl groups which may be condensed such as naphthyl, anthracenyl, fluorenyl, 1,2,3,4-tetrahydronaphthyl, indanyl, quinolinyl, and indonyl; and alkylaryl groups.

R is individually $-R^1$, $-OR^1$, $-COR^1$, $-COOR^1$, $-CO(COR^1)$, or $-CO(COOR^1)$. Here, $R^1$ is a hydrocarbon group with 4 or more carbon atoms which may have a substituent, silyl group, alkylsilyl group, $-(R^2O)_x-R^3$, or $-(OSiR^3{}_2)_x-OR^3$ (wherein $R^2$ is an alkylene group, $R^3$ is a hydrocarbon group ($R^3$s may be the same or different), and x is an integer of 1 or more). When $R^1$ is a hydrocarbon group, examples of $R^1$ include a linear or branched butyl group, pentyl group, hexyl group, heptyl group, octyl group, nonyl group, decyl group, dodecyl, pentadecyl group, and eicosanyl group.

n is an integer of 2 or more and m is a valence of M.

As the compound shown by the formula (I), a dialkylbenzenesulfonic acid, dialkylnaphthalenesulfonic acid, sulfophthalate, and compound shown by the following formula (II) can be preferably used.

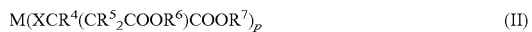

Like formula (I), M in the above formula (II) is a hydrogen atom, or an organic or inorganic free radical. As examples of the organic free radical, a pyridinium group, imidazolium group, and anilinium group can be given. As examples of the inorganic free radial, sodium, lithium, potassium, cerium, and ammonium can be given.

X is an acidic group, for example, an $-SO_3^-$ group, $-PO_3^{2-}$ group, $-PO_4(OH)^-$ group, $-OPO_3^{2-}$ group, $-OPO_2(OH)^-$ group, and $-COO^-$ group, with the $-SO_3^-$ group being preferable.

$R^4$ and $R^5$ are independently a hydrogen atom, hydrocarbon group, or $R^8{}_3Si-$ (wherein $R^8$ is a hydrocarbon group (three $R^8$s may be the same or different)). When $R^4$ and $R^5$ are hydrocarbon groups, examples of the hydrocarbon groups include a linear or branched alkyl group, aryl group including an aromatic ring, or alkylaryl group having 1 to 24 carbon atoms. When $R^8$ is a hydrocarbon group, examples of the hydrocarbon group include the same groups as mentioned for $R^4$ and $R^5$.

$R^6$ and $R^7$ are independently a hydrocarbon group or $-(R^9O)_q-R^{10}$ (wherein $R^9$ is a hydrocarbon group or silylene group, $R^{10}$ is a hydrogen atom, hydrocarbon group, or $R^{11}{}_3Si-$ (wherein $R^{11}$ is a hydrocarbon group (three $R^{11}$s may be the same or different)), and q is an integer of 1 or more). When $R^6$ and $R^7$ are hydrocarbon groups, examples of the hydrocarbon groups include a linear or branched alkyl group, aryl group including an aromatic ring, or alkylaryl group having 1 to 24 carbon atoms, preferably 4 or more carbon atoms. When $R^6$ and $R^7$ are hydrocarbon groups, specific examples of the hydrocarbon groups include a linear or branched butyl group, pentyl group, hexyl group, octyl group, and decyl group.

In $R^6$ and $R^7$, when $R^9$ is a hydrocarbon group, examples of the hydrocarbon group include a linear or branched alkylene group, arylene group including an aromatic ring, alkylarylene group, or arylalkylene group having 1 to 24 carbon atoms. In $R^6$ and $R^7$, when $R^{10}$ and $R^{11}$ are hydrocarbon groups, examples of the hydrocarbon groups include the same groups as mentioned for $R^4$ and $R^5$ can be given. q is preferably 1 to 10.

When $R^6$ and $R^7$ are groups represented by $-(R^9O)_n-R^{10}$, groups shown by the following formula can be given as specific examples,

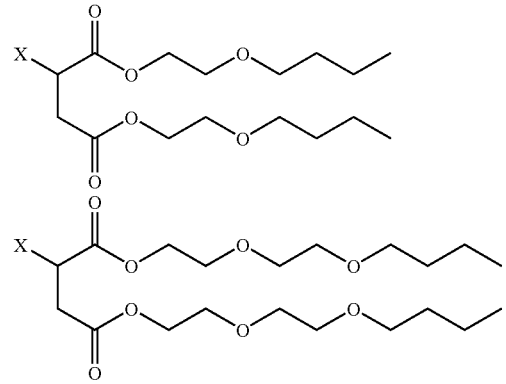

wherein X represents $-SO_3$ and the like.

p is a valence of M.

The above organic protonic acid (II) or the salt thereof is preferably a sulfosuccinic acid derivative represented by the following formula (III) (hereinafter referred to as "sulfosuccinic acid derivative (III)").

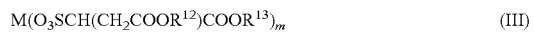

In the above formula (III), M and m are the same as in the above formula (I).

$R^{12}$ and $R^{13}$ are independently a hydrocarbon group or $-(R^{14}O)_r-R^{15}$ (wherein $R^{14}$ is a hydrocarbon group or silylene group, $R^{15}$ is a hydrogen atom, hydrocarbon group, or $R^{16}{}_3Si-$ (wherein $R^{16}$ is a hydrocarbon group (three $R^{16}$s may be the same or different)), and r is an integer of 1 or more).

When $R^{12}$ and $R^{13}$ are hydrocarbon groups, examples of the hydrocarbon groups include the same groups as mentioned for $R^6$ and $R^7$.

In $R^{12}$ and $R^{13}$, when $R^{14}$ is a hydrocarbon group, the same groups as mentioned for $R^9$ can be given as the hydrocarbon group. In $R^{12}$ and $R^3$, when $R^{15}$ and $R^{16}$ are hydrocarbon groups, the same groups as mentioned for $R^4$ and $R^5$ can be given as the hydrocarbon groups.

r is preferably 1 to 10.

When $R^{12}$ and $R^{13}$ are groups represented by $-(R^{14}O)_q-R^{15}$, examples thereof include the same groups as mentioned for $-(R^9O)_n-R^{10}$ in $R^6$ and $R^7$.

When $R^{12}$ and $R^{13}$ are hydrocarbon groups, examples of the hydrocarbon groups include the same groups as mentioned for $R^6$ and $R^7$, with a butyl group, hexyl group, 2-ethylhexyl group, decyl group, and the like being preferable.

The above-mentioned organic protonic acid (I) or the salt thereof has a function of protonating polyaniline and is present as a dopant (counteranion) in the polyaniline complex (a). Specifically, two compounds, that is, the organic protonic acid (I) or the salt thereof and the above phenolic compounds (b), function as dopants in the composition of the invention. The above-mentioned organic protonic acid (I) or the salt thereof appear to be present as a cation in the composition of the invention.

Although there are no specific limitations to the ratio of the polyaniline and organic protonic acid (I) or the salt thereof in the polyaniline complex (a), the molar ratio of polyaniline monomer units/organic protonic acid (I) or the salt thereof is usually 0.1 to 2, and preferably 0.1 to 0.5. If the proportion of the organic protonic acid (I) or the salt thereof is too small, the electric conductivity does not increase. The conductivity also decreases when the proportion thereof is too great, because of a decrease in the proportion of polyaniline which governs the electric characteristics of molded articles. Although the weight ratio changes according to the molecular weight of the protonic acid, a protonated substituted or unsubstituted polyaniline complex (a) containing substituted or unsubstituted polyaniline; in an amount of 20 to 70 wt % is preferable because of its high electric characteristics.

The organic protonic acid (I) or the salt thereof used in the invention can be produced by a known method. For example, a sulfophthalate derivative or sulfosuccinate derivative can be obtained by the reaction of a corresponding sulfophthalic acid derivative or sulfosuccinic acid derivative, and a desired alcohol. In addition, hydrosulfonylating a maleate with sodium hydrogensulfite or the like to produce a corresponding sulfosuccinate derivative is also known.

A commercially available product of organic protonic acid (I) or a salt thereof can also be used. As examples of the commercially available product, Aerosol OT (diisooctyl sodium sulfosuccinate, manufactured by Wako Pure Chemical Industries, Ltd.) and Liparl 87OP (manufactured by Lion Corp.) can be given. Although some commercially available products have different purities, appropriate products may be selected as required.

As the organic solvent substantially immiscible with water (hereinafter referred to as "water immiscible organic solvent") used in the composition of the invention, hydrocarbon solvents such as benzene, toluene, xylene, ethylbenzene, and tetralin; halogen-containing solvents such as methylene chloride, chloroform, carbon tetrachloride, dichloroethane, trichloroethane, and tetrachloroethane; ester solvents such as ethyl acetate; and the like can be given. Of these, toluene, xylene, chloroform, trichloroethane, ethyl acetate, and the like are preferable.

The polyaniline complex (a) used in the invention is preferably produced by chemical oxidation polymerization.

As a solvent, an acidic aqueous solution and a mixed solvent of a hydrophilic organic solvent and an acidic aqueous solution can be generally used for the chemical oxidation polymerization. In the production of the polyaniline complex (a), a mixed solvent of a water immiscible organic solvent and an acidic aqueous solution can also be used. Use of such a mixed solvent is preferable.

When the mixed solvent of a water immiscible organic solvent and water is used, the polyaniline complex (a) produced by the polymerization reaction is obtained in a state of being dissolved in the water immiscible organic solvent phase, if the organic protonic acid (I) or a salt thereof is present in the mixed solvent during the polymerization of aniline. The polyaniline complex (a) dissolved in the water immiscible organic solvent can be promptly obtained by separating the water phase.

When the polyaniline complex (a) is produced using the mixed solvent of a water immiscible organic solvent and water in the presence of the organic protonic acid (I) or a salt thereof, the organic protonic acid (I) or a salt thereof also functions as a surfactant.

The molar ratio of the organic protonic acid (I) or the salt thereof to the aniline or a substituted aniline to be polymerized is usually 0.05 to 1, and preferably 0.1 to 0.5. If the molar ratio of the organic protonic acid (I) or a salt thereof is smaller than 0.05, the polymerization reaction proceeds slowly, whereby a molded product with high conductivity may not be produced as a result. If the molar ratio is more than 1, a water phase can be separated only with difficulty after polymerization, whereby a molded product with high conductivity may not be produced as a result.

Although not specifically limited, inorganic compounds, including peroxide salts such as ammonium persulfate, sodium persulfate, and potassium persulfate; ammonium dichromate, ammonium perchlorate, iron (III) potassium sulfate, iron (III) trichloride, manganese dioxide, iodic acid, potassium permanganate, and the like can be used as an initiator in the chemical oxidation reaction. Compounds that oxidize at room temperature or below are preferable. When a mixed solvent of a water immiscible organic solvent and water is used, it is preferable to use a water-soluble initiator in order to prevent an unreacted initiator from mixing in an organic phase. Preferable examples of the initiator include ammonium persulfate, sodium persulfate, potassium persulfate, and ammonium perchlorate, with ammonium persulfate being particularly preferable.

Although the polymerization reaction conditions are not specifically limited, the reaction temperature is usually from −20° C. to 30° C., and preferably 5° C. or less.

When the polyaniline complex (a) is produced by chemical oxidation polymerization in a water-immiscible organic solvent, the phenolic compound (b) may be added either in the state in which the resulting polyaniline complex (a) is dissolved in the organic solvent used in the polymerization, or after removing the organic solvent from the polyaniline complex (a) which is dissolved in the organic solvent to obtain a solid polyaniline complex (a), and again dissolving it in a water immiscible organic solvent. In this case, the water immiscible organic solvent used for the polymerization and the water immiscible organic solvent used for dissolving again the solid polyaniline complex (a) may be either the same or different.

The polyaniline complex (a) used in the invention can also be produced by chemical oxidation polymerization in an acidic aqueous solution without using the mixed solvent of a water immiscible organic solvent and water. Although such a method is widely known in the art, the polyaniline or polyaniline complex is obtained in a state of being deposited in the aqueous solution. The deposited product contains a large amount of impurities such as unreacted aniline monomers and oligomers, initiators, and the like. For this reason, the deposited polyaniline or polyaniline complex must be purified into an emeraldine base by reduction using a base such as ammonia or hydrazine.

A common electrolytic polymerization method can be used for producing the polyaniline complex (a) instead of the chemical oxidation polymerization.

The amount of the polyaniline complex (a) used in the water immiscible organic solvent in the composition of the invention is usually 900 g/l or less, and preferably 0.01 to 300 g/l or less, depending on the type of the water immiscible organic solvent. If the amount of polyaniline complex (a) is too great, the mixture cannot be maintained as a solution, resulting in difficult handling during fabrication of molded articles, impaired homogeneity of molded articles, and a decrease in electric characteristics, mechanical strength, and transparency of the molded articles.

In order to obtain the composition of the invention (conductive polyaniline composition) comprising polyaniline complex (a) and phenolic compounds (b) dissolved in a water immiscible organic solvent, the phenolic compounds (b) are added to the solution of the polyaniline complex (a) dissolved in the water immiscible organic solvent obtained in the manner as described above. Specifically, the phenolic compounds (b) may be added in a solid state, in a liquid state, or in a state of being dissolved or suspended in water immiscible organic solvent. Preferably, an appropriate solvent addition method is selected so that the state of being dissolved in the solvent is maintained after the addition.

Next, the conductive molded article of the invention (hereinafter referred to as "molded article of the invention") is characterized by molding the composition of the invention (conductive polyaniline composition).

Other resin materials, inorganic materials, curing agents, plasticizers, and other additives may be added to the composition of the invention according to the objective.

Other resin materials are added for the objective such as a binder, plasticizer, matrix, or the like. As specific examples, polyethylene, polypropylene, polystyrene, polyethylene terephthalate, polycarbonate, polyethylene glycol, polyethylene oxide, polyacrylic acid, polyacrylate, polymethacrylate, and polyvinyl alcohol can be given. When another resin material is included, the composition of the invention is a conductive composite material.

The inorganic material is added with an objective of improving, for example, strength, surface hardness, dimensional stability, and other mechanical characteristics. As specific examples, silica (silicon dioxide), titania (titanium oxide), and alumina (aluminium oxide) can be given.

The curing agent is added with an objective of improving, for example, strength, surface hardness, dimensional stability, and other mechanical characteristics. As specific examples, heat-curing agents such as a phenol resin, and photo-curing agents such as a composition comprising an acrylate monomer and a photopolymerization initiator can be given.

The plasticizer is added with an objective of improving, for example, mechanical characteristics such as tensile strength and bending strength. As specific examples, phthalates and phosphates can be given.

The surface transparent conductive product of the invention can be produced by applying the composition of the invention comprising the polyaniline complex (a) and phenolic compound (b) dissolved in a water immiscible organic solvent obtained as described above to a substrate such as glass and, a film or sheet of resin with a desired shape, and removing the water immiscible organic solvent.

As the method for applying the composition of the invention to a substrate, commonly known methods such as a casting method, spraying method, dip coating method, doctor blade method, bar coat method, spin coat method, screen printing, and gravure method can be used.

In order to remove the water immiscible organic solvent, the coated product is heated to vaporize the organic solvent.

As the method for vaporizing the water immiscible organic solvent, the coated products are, for example, heated in an air stream at 250° C. or less, preferably at 50 to 200° C., if necessary, under reduced pressure. Heating temperature and heating time are not specifically limited and can be appropriately determined according to the material used.

Although the molded article of the invention is a thin film prepared by applying the composition of the invention to a substrate and removing the water immiscible organic solvent, this film can be formed into a self-supporting molded article which does not have a substrate. When producing the self-supporting molded article, a molded article with desired mechanical strength can be obtained by adding the above resin material other than polyaniline to the composition of the invention.

When the molded article of the invention is a membrane or film, the thickness thereof is usually 1 mm or less, and preferably in a range of 10 nm to 50 μm.

The inherent conductivity of the molded article of the invention exhibits a very high value of 10 S/cm or higher, and preferably 50 S/cm or higher.

The inherent conductivity can be measured by a two-terminal method, four-terminal method, four probe method, Van der Poe method, or the like, after applying the composition of the invention on a glass substrate. The inherent conductivity in the present specification was measured using a commercially-available resistivity meter ("Loresta GP" by four probe method, manufactured by Mitsubishi Chemical Corp.).

The specific surface resistance of the surface transparent conductive product of the invention is preferably $10^5$ Ω/square or less.

The light transmission at a wavelength of 450 nm is preferably 70% or more. The composition of the invention is one comprising a small amount of a compound having a phenolic hydroxyl group added thereto, from which a conductive article with very high transparency due to its homogeneity can be obtained.

EXAMPLES

The invention will be described in more detail by way of examples and comparative examples. P The molecular weight of polyaniline was determined by gel permeation chromatography (GPC). Specifically, TOSOH TSK-GEL GMHHR-H as a column and a 0.01 M LiBr/N-methylpyrrolidone solution were used at 60° C. at a flow rate of 0.35 ml/min. 100 μl of a sample solution at a concentration of 0.2 g/l was charged and detected by a 260 nm UV light. As a standard, an average molecular weight was calculated by the PS conversion method.

Example 1

Preparation of Conductive Polyaniline Composition (1) Preparation of Protonated Polyaniline Complex A 1 l glass flask equipped with a mechanical stirrer and a dropping funnel was charged with 100 ml of toluene, and 3.6 g of Aerosol OT (sodium diisooctylsulfosuccinate, manufactured by Wako Pure Chemical Industries, Ltd.) and 3.74 g of aniline (manufactured by Wako Pure Chemical Industries, Ltd.) were dissolved therein. 300 ml of 1 N hydrochloric acid aqueous solution was added with stirring and the flask was cooled with an ice cold water bath. A solution of 5.36 g of ammonium persulfate dissolved in 100 ml of 1 N hydrochloric acid aqueous solution was added dropwise from the dropping funnel to initiate polymerization of aniline. The polymerization reaction was carried out while cooling the flask with the ice cold water bath and the stirring was stopped after 18 hours. The reaction solution was transferred into a separating funnel. Of the resulting two layers, the water layer was discharged and the toluene organic layer was washed twice with ion-exchanged water and twice with 1 N hydrochloric acid aqueous solution. Volatile components (organic solvent) were evaporated from the toluene solution containing the target compound under reduced pressure, thereby obtaining a solid protonated polyaniline complex.

(2) Molecular Weight and Composition of Polyaniline Complex

The polyaniline complex obtained in (1) above was again dissolved in toluene to prepare a toluene solution containing the polyaniline complex at a concentration of 50 g/l. 5 ml of this solution was mixed with 10 ml of 1 N sodium hydroxide aqueous solution to deposit non-conductive polyaniline (in a state of a so-called emeraldine base) which is undissolvable in both solutions. This non-conductive polyaniline was separated by filtration and dried. As a result of GPC measurement using an NMP solvent, the product was a very high molecular weight compound with a PS-reduced weight average molecular weight of 614,000 g/mol.

(3) Production of Conductive Polyaniline Composition

The polyaniline complex obtained in (1) above was again dissolved in toluene to prepare a toluene solution containing the polyaniline complex at a concentration of 50 g/l. 0.2 mmol of m-cresol was added to 1 ml of this toluene solution to obtain a conductive polyaniline composition with an m-cresol concentration of about 0.2 mol/l.

(4) Production of Conductive Polyaniline Molded Product

The conductive polyaniline composition obtained in (3) was applied onto an area of 14 mm×52 mm on a glass substrate, and dried in an air stream at 80° C. for 30 minutes to obtain a conductive coated film with a thickness of 15 µm. The inherent conductivity of the film was measured using "Loresta GP" (a resistivity meter using the four probe method, manufactured by Mitsubishi Chemical Corp.). The inherent conductivity of the coated film was 59 S/cm.

Example 2

A conductive coated film was obtained in the same manner as in Example 1, except for adding 1 mmol of m-cresol in Example 1(3) to prepare a composition with an m-cresol concentration of about 0.9 mol/l. The resulting coated film was separated from the glass substrate to obtain a self-supporting film. The inherent conductivity of the self-supporting film was 318 S/cm.

Example 3

A conductive coated film was obtained in the same manner as in Example 1, except for adding 1 mmol of phenol instead of m-cresol in Example 1 (3) to prepare a composition with a phenol concentration of about 0.9 mol/l. The inherent conductivity of the coated film was 171 S/cm.

Comparative Example 1

A coated film was prepared in the same manner as in Example 1 except that the addition of m-cresol in Example 1(3) was omitted. The inherent conductivity of the coated film was $3.51 \times 10^{-3}$ S/cm.

Example 4

(1) A protonated polyaniline complex in a solid form was prepared in the same manner as in Example 1(1), except for using xylene instead of toluene.

(2) The polyaniline complex obtained in (1) above was dissolved in chloroform to prepare a chloroform solution of the polyaniline complex. 1 mmol of m-cresol was added to 1 ml of a chloroform solution containing the polyaniline complex at a concentration of 50 g/l to obtain a conductive polyaniline composition with an m-cresol concentration of about 0.9 mol/l.

(3) The conductive polyaniline composition obtained in (2) was applied onto an area of 14 mm×50 mm on a glass substrate, dried in an air stream at 80° C. for 30 minutes, and further dried at 80° C. for four hours under reduced pressure to obtain a conductive coated film with a thickness of 30 µm. The resulting coated film exhibited an extremely high inherent conductivity of 308 S/cm. The wide angle X-ray dispersion spectrum of the self-supporting film obtained by peeling this coated film from the glass substrate is shown in FIG. 1.

Example 5

A conductive coated film was prepared in the same manner as in Example 4 except that 1 mmol of o-cresol was added instead of m-cresol. The resulting coated film exhibited an extremely high inherent conductivity of 35.5 S/cm.

Example 6

A conductive coated film was prepared in the same manner as in Example 4 except that 1 mmol of p-cresol was added instead of m-cresol. The resulting coated film exhibited an extremely high inherent conductivity of 277 S/cm.

Comparative Example 2

A coated film was prepared in the same manner as in Example 4 except that the addition of m-cresol in Example 4(2) was omitted. The inherent conductivity of the resulting coated film was 0.02 S/cm. The wide angle X-ray dispersion spectrum of the self-supporting film obtained by peeling this coated film from the glass substrate is shown in FIG. 2.

No significant change in crystal conditions is observed in comparison of FIG. 1 and FIG. 2. Therefore, it can be understood that the addition of m-cresol to the composition of the invention does not affect the crystal conditions of the polyaniline complex and the composition and that the inherent conductivity does not change according to change in the degree of crystallization.

Example 7

Figure 3:
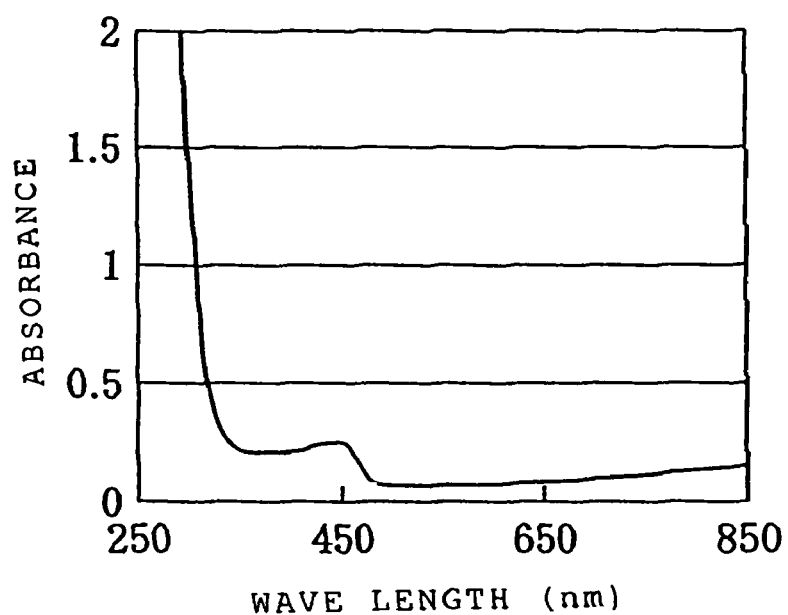
FIG. 3 is a UV-vis (ultraviolet-visible ray) spectrum of a formed article (membrane) produced from the composition of the invention containing a phenolic compound (b).

Toluene was added to the conductive polyaniline composition used in Example 2 to dilute it to two times the original concentration to prepare a composition solution with a concentration of 25 g/l. Several milliliters of this composition solution was applied onto a glass substrate with a size of 5 cm×5 cm and spin coated at 1,000 rpm for one minute. The coated glass substrate was dried in an air stream at 120° C. for 10 minutes. The thickness of the coated film (molded article) on the glass substrate was 50 nm. The surface resistance of the coated film on the glass substrate was 1.19 kΩ/square, indicating very high conductivity. The UV-vis (ultraviolet-visible ray) spectrum of the coated film on the glass substrate is shown in FIG. 3. Based on this spectrum, the light transmission at a wavelength of 450 nm was 76%.

The surface resistance of the coated film was measured using the above-mentioned "Loresta GP".

Comparative Example 3

A coated glass substrate was obtained in the same manner as in Example 7, except for using a composition solution prepared by diluting the composition prepared in Comparative Example 1 without adding m-cresol to a two-fold with toluene. The thickness of the resulting coated film (molded article) on the glass substrate was 48 nm. The surface resistance of the coated film on the glass substrate was a very high value of 78.0 MΩ/square, indicating very low conductivity. The UV-vis spectrum of the coated film on the glass substrate is shown in FIG. 4.

Figure 4:
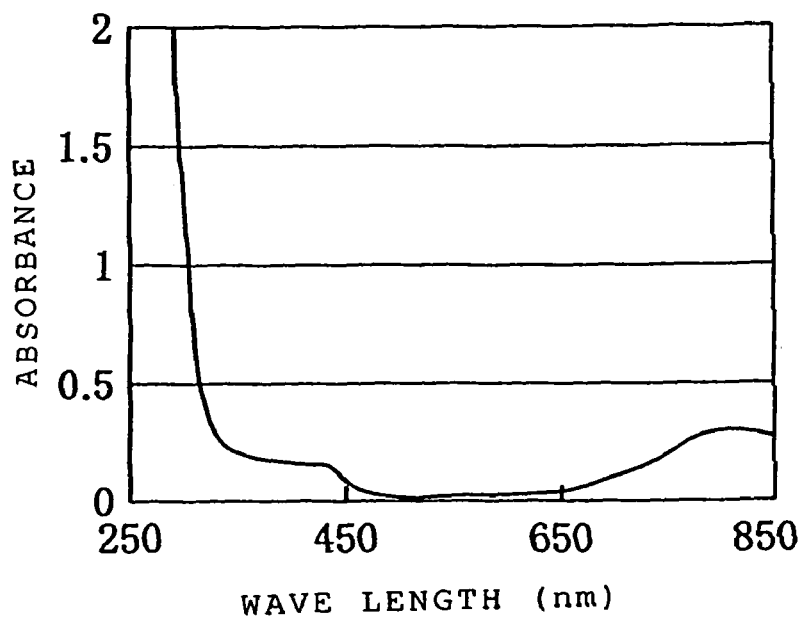
FIG. 4 is a UV-vis (ultraviolet-visible ray) spectrum of a formed article (membrane) produced from a polyaniline complex (a) dissolved in an organic solvent not containing a phenolic compound (b).

Comparison of FIG. 3 and FIG. 4 shows that at near 800 nm, the coated film obtained from the composition not containing m-cresol has an absorbance as shown in FIG. 4, and in contrast, the coated film obtained from the composition containing m-cresol has a weaker absorbance as shown in FIG. 3 and that an absorbance appears near 450 nm in the coated film obtained by the composition containing m-cresol. These results clearly indicate that the properties of the coated film (molded article) produced from the composition containing m-cresol (phenolic compound (b)) differs from those of the coated film (molded article) produced from the composition not containing m-cresol. The results thus show that m-cresol (a phenolic compounds (b)) is present as a dopant in the coated film.

Example 8

(1) Preparation of Protonated Polyaniline Complex

A 1 l glass flask equipped with a mechanical stirrer and a dropping funnel was charged with 100 ml of toluene, and 3.6 g of sodium diisooctylsulfosuccinate (manufactured by Tokyo Chemical Industry Co., Ltd., purity>95%.) and 3.74 g of aniline (manufactured by Wako Pure Chemical Industries, Ltd.) were dissolved. 300 ml of 1 N hydrochloric acid aqueous solution was added with stirring and the flask was dipped and cooled in a thermostat vessel at 0° C. While maintaining the internal temperature of the flask at 0° C., a solution of 5.36 g of ammonium persulfate dissolved in 100 ml of 1 N hydrochloric acid aqueous solution was added dropwise from the dropping funnel to initiate polymerization of aniline. The polymerization reaction was carried out while cooling the flask constantly at 0° C. and the stirring was stopped after 20 hours. The reaction solution was transferred into a separating funnel. Of the resulting two layers, the water layer was discharged and the toluene organic layer was washed twice with ion-exchanged water and twice with 1 N hydrochloric acid aqueous solution. Volatile components (organic solvent) were evaporated from the toluene solution containing the target compound under reduced pressure, thereby obtaining a solid protonated polyaniline complex. The resulting polyaniline complex was again dissolved in toluene and a small amount of insoluble matter was removed using a filter with a pore diameter of 250 μm to obtain a toluene solution containing no insoluble matter. Toluene was evaporated from the polyaniline complex solution on the filtrate side, thereby obtaining a solid protonated polyaniline complex.

(2) Molecular Weight and Composition of Polyaniline Complex

The polyaniline complex obtained in (1) above was again dissolved in toluene to prepare a toluene solution containing the polyaniline complex at a concentration of 50 g/l. 5 ml of this solution was mixed with 10 ml of 1 N sodium hydroxide aqueous solution by causing them to come in contact to deposit non-conductive polyaniline (in a state of a so-called emeraldine base) which is undissolvable in both solutions. 54.9 mg of insoluble matter was collected by filtration. Therefore, the polyaniline content in the complex was 22 wt %. As a result of GPC measurement using an NMP solvent, the polyaniline was a high molecular weight material with a PS-reduced weight average molecular weight of 108,000 g/mol.

A 50 g/l solution of the polyaniline complex obtained by this production method in toluene was applied onto an area of 14 mm×51 mm on a glass substrate, and dried in an air stream at 80° C. for 120 minutes to obtain a conductive coating film with a thickness of 24 μm. The inherent conductivity of the film was measured using "Loresta GP" (a resistivity meter using the four probe method, manufactured by Mitsubishi Chemical Corp.). The resulting coated film exhibited an extremely high inherent conductivity of 29 S/cm as a polyaniline complex.

(3) Production of Conductive Polyaniline Composition

The polyaniline complex obtained in (1) above was again dissolved in toluene to prepare a toluene solution containing the polyaniline complex at a concentration of 50 g/l. 5 mmol of m-cresol was added to 5 ml of this toluene solution to obtain a conductive polyaniline composition with an m-cresol concentration of about 0.9 mol/l.

(4) Production of Conductive Polyaniline Molded Product

The conductive polyaniline composition obtained in (3) was applied onto an area of 15 mm×51 mm on a glass substrate, and dried in an air stream at 80° C. for 120 minutes to obtain a conductive coating film with a thickness of 17 μm. The inherent conductivity of the film was measured using "Loresta GP" (a resistivity meter using the four probe method, manufactured by Mitsubishi Chemical Corp.). The inherent conductivity of the coated film was 237 S/cm.

Example 9

(1) Preparation of Protonated Polyaniline Complex

A protonated polyaniline complex in a solid form was prepared in the same manner as in Example 8, except that the polymerization reaction was carried out while cooling to maintain the internal temperature of the flask constantly at 5° C.

(2) Molecular Weight and Composition of Polyaniline Complex

The polyaniline complex obtained in (1) above was again dissolved in toluene to prepare a toluene solution containing the polyaniline complex at a concentration of 50 g/l. 5 ml of this solution was mixed with 10 ml of 1 N sodium hydroxide aqueous solution by causing them to come in contact to obtain precipitate. The precipitate was collected by filtration to obtain 75.3 mg of deposited non-conductive polyaniline (in a state of a so-called emeraldine base). Therefore, the polyaniline content in the complex was 30 wt %. As a result of GPC measurement using an NMP solvent, the polyaniline was a very high molecular weight material with a PS-reduced weight average molecular weight of 306,300 g/mol.

A 50 g/l solution of the polyaniline complex obtained by this production method in toluene was applied onto an area of 14 mm×51 mm on a glass substrate, and dried in an air stream at 80° C. for 120 minutes to obtain a conductive coating film with a thickness of 26 µm. The inherent conductivity of the film was measured using "Loresta GP" (a resistivity meter using the four probe method, manufactured by Mitsubishi Chemical Corp.). The resulting coated film exhibited an extremely high inherent conductivity of 29 S/cm as a polyaniline complex.

(3) Production of Conductive Polyaniline Composition

The polyaniline complex obtained in (1) above was again dissolved in toluene to prepare a toluene solution containing the polyaniline complex at a concentration of 50 g/l. 4 mmol of m-cresol was added to 4 ml of this toluene solution to obtain a conductive polyaniline composition with an m-cresol concentration of about 0.9 mol/l.

(4) Production of Conductive Polyaniline Molded Product

The conductive polyaniline composition obtained in (3) was applied onto an area of 15 mm×51 mm on a glass substrate, and dried in an air stream at 80° C. for 120 minutes to obtain a conductive coating film with a thickness of 19.5 µm. The inherent conductivity of the film was measured using "Loresta GP" (a resistivity meter using the four probe method, manufactured by Mitsubishi Chemical Corp.). The inherent conductivity of the coated film was 326 S/cm.

Example 10

A conductive coated film was obtained in the same manner as in Example 9(3), except for adding 2 mmol of m-cresol in Example 9(3) to prepare a composition with an m-cresol concentration of about 0.5 mol/l. The thickness of the conductive coated film was 24.5 µm. The inherent conductivity measured using "Loresta GP" (a resistivity meter using the four probe method, manufactured by Mitsubishi Chemical Corp.) was 178 S/cm.

Example 11

A conductive coated film was obtained in the same manner as in Example 9(3), except for adding 1 mmol of m-cresol in Example 9(3) to prepare a composition with an m-cresol concentration of about 0.24 mol/l. The thickness of the conductive coated film was 37 µm. The inherent conductivity measured using "Loresta GP" (a resistivity meter using the four probe method, manufactured by Mitsubishi Chemical Corp.) was 108 S/cm.

Example 12

(1) Preparation of Protonated Polyaniline Complex

A 1 l glass flask equipped with a mechanical stirrer and a dropping funnel was charged with 100 ml of toluene, and 3.6 g of sodium diisooctylsulfosuccinate (manufactured by Tokyo Chemical Industry Co., Ltd., purity>95%) and 3.74 g of aniline (manufactured by Wako Pure Chemical Industries, Ltd.) were dissolved therein. 300 ml of 1 N hydrochloric acid aqueous solution was added with stirring and the flask was dipped and cooled in a thermostat vessel at 15° C. While maintaining the internal temperature of the flask at 15° C., a solution of 7.30 g of ammonium persulfate dissolved in 100 ml of 1 N hydrochloric acid aqueous solution was added dropwise from the dropping funnel to initiate polymerization of aniline. The polymerization reaction was carried out while cooling the flask constantly at 15° C. and the stirring was stopped after 10 hours. The reaction solution was transferred into a separating funnel to remove the water layer from the reaction solution separated into two layers. The toluene organic layer was washed twice with ion-exchanged water and twice with 1 N hydrochloric acid aqueous solution. Volatile components (organic solvent) were evaporated from the toluene solution containing the target compound under reduced pressure, thereby obtaining a solid protonated polyaniline complex. The resulting polyaniline complex was again dissolved in toluene and a small amount of insoluble matter was removed using a filter with a pore diameter of 250 µm to obtain a toluene solution containing no insoluble matter. Toluene was evaporated from the polyaniline complex solution on the filtrate side, thereby obtaining a soluble solid protonated polyaniline complex.

(2) Molecular Weight and Composition of Polyaniline Complex

The polyaniline complex obtained in (1) above was again dissolved in toluene to prepare a toluene solution containing the polyaniline complex at a concentration of 50 g/l. 5 ml of this solution was mixed with 10 ml of 1N sodium hydroxide aqueous solution by causing them to come in contact to deposit non-conductive polyaniline (in a state of a so-called emeraldine base) which is undissolvable in both solutions. 104.1 mg of insoluble matter was collected by filtration. Therefore, the polyaniline content in the complex was 42 wt %.

(3) Production of Conductive Polyaniline Composition

The polyaniline complex obtained in (1) above was again dissolved in toluene to prepare a toluene solution containing the polyaniline complex at a concentration of 50 g/l. 5 mmol of m-cresol was added to 5 ml of this toluene solution to obtain a conductive polyaniline composition with an m-cresol concentration of about 0.9 mol/l.

(4) Production of Conductive Polyaniline Molded Product

The conductive polyaniline composition obtained in (3) above was applied onto an area of 15 mm×50 mm on a glass substrate, and dried in an air stream at 80° C. for 120 minutes to obtain a conductive coating film with a thickness of 22 µm. The inherent conductivity of the film was measured using "Loresta GP" (a resistivity meter using the four probe method, manufactured by Mitsubishi Chemical Corp.). The inherent conductivity of the coated film was 261 S/cm.

Example 13

A conductive coated film was prepared in the same manner as in Example 12(3), except that a composition with an m-cresol concentration of about 0.24 mol/l prepared by adding 1 mmol of m-cresol to 4 ml of a toluene solution containing the polyaniline complex at a concentration of 50 g/l was used. The thickness of the conductive coated film was 33 µm. The inherent conductivity measured using "Loresta GP" (a resistivity meter using the four probe method, manufactured by Mitsubishi Chemical Corp.) was 156 S/cm.

Example 14

(1) Preparation of Protonated Polyaniline Complex

A 1 l glass flask equipped with a mechanical stirrer and a dropping funnel was charged with 100 ml of toluene, and 2.7 g of sodium diisooctylsulfosuccinate (manufactured by Tokyo Chemical Industry Co., Ltd., purity>95%) and 3.74 g of aniline (manufactured by Wako Pure Chemical Industries, Ltd.) were dissolved therein. 300 ml of 1 N hydrochloric acid aqueous solution was added with stirring and the flask was dipped and cooled in a thermostat vessel at 5° C. While maintaining the internal temperature of the flask at 5° C., a solution of 9.13 g of ammonium persulfate dissolved in 100 ml of 1 N hydrochloric acid aqueous solution was added dropwise from the dropping funnel to initiate polymerization of aniline. The polymerization reaction was carried out while cooling the flask constantly at 5° C. and the stirring was stopped after 10 hours. The reaction solution was transferred into a separating funnel to remove the water layer from the reaction solution separated into two layers. The toluene organic layer was washed twice with ion-exchanged water and twice with 1 N hydrochloric acid aqueous solution. Volatile components (organic solvent) were evaporated from the toluene solution containing the target compound under reduced pressure, thereby obtaining a solid protonated polyaniline complex. The resulting polyaniline complex was again dissolved in toluene and a small amount of insoluble matter was removed using a filter with a pore diameter of 250 µm to obtain a toluene solution containing no insoluble matter. Toluene was evaporated from the polyaniline complex solution on the filtrate side, thereby obtaining a soluble solid protonated polyaniline complex.

(2) Molecular Weight and Composition of Polyaniline Complex

The polyaniline complex obtained in (1) above was again dissolved in toluene to prepare a toluene solution containing the polyaniline complex at a concentration of 50 g/l. 5 ml of this solution was mixed with 10 ml of 1 N sodium hydroxide aqueous solution by causing them to come in contact to deposit non-conductive polyaniline (in a state of a so-called emeraldine base) which is undissolvable in both solutions. 150.2 mg of insoluble matter was collected by filtration. Therefore, the polyaniline content in the complex was 60 wt %. As a result of GPC measurement using an NMP solvent, the polyaniline had a PS-reduced weight average molecular weight of 26,300 g/mol.

(3) Production of Conductive Polyaniline Composition

The polyaniline complex obtained in (1) above was again dissolved in toluene to prepare a toluene solution containing the polyaniline complex at a concentration of 50 g/l. 1 mmol of m-cresol was added to 4 ml of this toluene solution to obtain a conductive polyaniline composition with an m-cresol concentration of about 0.24 mol/l.

(4) Production of Conductive Polyaniline Molded Product

The conductive polyaniline composition obtained in (3) above was applied onto an area of 15 mm×50 mm on a glass substrate, and dried in an air stream at 80° C. for 120 minutes to obtain a conductive coated film with a thickness of 10.5 µm. The inherent conductivity of the film was measured using "Loresta GP" (a resistivity meter using the four probe method, manufactured by Mitsubishi Chemical Corp.). The inherent conductivity of the coated film was 251 S/cm.

Example 15

(1) Preparation of Protonated Polyaniline Complex

A 1 l glass flask equipped with a mechanical stirrer and a dropping funnel was charged with 100 ml of toluene, and 2.7 g of sodium diisooctylsulfosuccinate (manufactured by Tokyo Chemical Industry Co., Ltd., purity>95%) and 3.74 g of aniline (manufactured by Wako Pure Chemical Industries, Ltd.) were dissolved therein. 300 ml of 1 N hydrochloric acid aqueous solution was added with stirring and the flask was dipped and cooled in a thermostat vessel at 0° C. While maintaining the internal temperature of the flask at 0° C., a solution of 5.36 g of ammonium persulfate dissolved in 100 ml of 1 N hydrochloric acid aqueous solution was added dropwise from the dropping funnel to initiate polymerization of aniline. The polymerization reaction was carried out while cooling the flask constantly at 0° C. and the stirring was stopped after 6 hours. The reaction solution was transferred into a separating funnel to remove the water layer from the reaction solution separated into two layers. The toluene organic layer was washed twice with ion-exchanged water and twice with 1 N hydrochloric acid aqueous solution. Volatile components (organic solvent) were evaporated from the toluene solution containing the target compound under reduced pressure, thereby obtaining a solid protonated polyaniline complex. The resulting polyaniline complex was again dissolved in toluene and a small amount of insoluble matter was removed using a filter with a pore diameter of 250 µm to obtain a toluene solution containing no insoluble matter. Toluene was evaporated from the polyaniline complex solution on the filtrate side, thereby obtaining a soluble solid protonated polyaniline complex.

(2) Molecular Weight and Composition of Polyaniline Complex

The polyaniline complex obtained in (1) above was again dissolved in toluene to prepare a toluene solution containing the polyaniline complex at a concentration of 50 g/l. 5 ml of this solution was mixed with 10 ml of 1 N sodium hydroxide aqueous solution by causing them to come in contact to deposit non-conductive polyaniline (in a state of a so-called emeraldine base) which is undissolvable in both solutions. 37.6 mg of insoluble matter was collected by filtration. Therefore, the polyaniline content in the complex was 15 wt %. As a result of GPC measurement using an NMP solvent, the polyaniline had a PS-reduced weight average molecular weight of 91,200 g/mol.

(3) Production of Conductive Polyaniline Composition

The polyaniline complex obtained in (1) above was again dissolved in toluene to prepare a toluene solution containing the polyaniline complex at a concentration of 50 g/l. 2 mmol of m-cresol was added to 2 ml of this toluene solution to obtain a conductive polyaniline composition with an m-cresol concentration of about 0.9 mol/l.

(4) Production of Conductive Polyaniline Molded Product

The conductive polyaniline composition obtained in (3) above was applied onto an area of 14 mm×50 mm on a glass substrate, and dried in an air stream at 80° C. for 120 minutes to obtain a slightly tacky conductive coated film with a thickness of 35 µm. The inherent conductivity was measured using "Loresta GP" (a resistivity meter using the four probe method, manufactured by Mitsubishi Chemical Corp.). The inherent conductivity of the coated film was 38 S/cm.

Example 16

(1) Preparation of Protonated Polyaniline Complex

A 1 l glass flask equipped with a mechanical stirrer and a dropping funnel was charged with 100 ml of toluene, and 4.67 g of dinonylnaphthalenesulfonic acid (manufactured by Aldrich Co., Ltd., obtained from a 50 wt/vol % heptane solution by evaporating heptane under reduced pressure) and 3.74 g of aniline (manufactured by Wako Pure Chemical Industries, Ltd.) were dissolved therein. 300 ml of 1 N hydrochloric acid aqueous solution was added with stirring and the flask was dipped and cooled in a thermostat vessel at −5° C. While maintaining the internal temperature of the flask at −5° C., a solution of 7.30 g of ammonium persulfate dissolved in 100 ml of 1 N hydrochloric acid aqueous solution was added dropwise from the dropping funnel to initiate polymerization of aniline. The polymerization reaction was carried out while cooling the flask constantly at −5° C. and the stirring was stopped after 10 hours. The reaction solution was transferred into a separating funnel. Of the resulting two layers, the water layer was discharged and the toluene organic layer was washed twice with ion-exchanged water and twice with 1 N hydrochloric acid aqueous solution. Volatile components (organic solvent) were evaporated from the toluene solution containing the target compound under reduced pressure, thereby obtaining a solid protonated polyaniline complex. The resulting polyaniline complex was again dissolved in toluene and insoluble matter was removed using a filter with a pore diameter of 250 μm to obtain a toluene solution containing no insoluble matter. Toluene was evaporated from the polyaniline complex solution on the filtrate side, thereby obtaining 4.47 g of a soluble protonated polyaniline complex.

Comparative Example 4

(1) Preparation of Polyaniline Complex

A 1 l glass flask equipped with a mechanical stirrer and a dropping funnel was charged with 300 ml of 1 N hydrochloric acid aqueous solution containing 1.36 g of (±) camphorsulfonic acid (manufactured by Wako Pure Chemical Industries, Ltd.) dissolved therein and 100 ml of toluene containing 3.74 g of aniline (manufactured by Wako Pure Chemical Industries, Ltd.) dissolved therein. The flask was dipped and cooled in a thermostat vessel at 5° C. While maintaining the internal temperature of the flask at 5° C., a solution of 7.30 g of ammonium persulfate dissolved in 100 ml of 1 N hydrochloric acid aqueous solution was added dropwise from the dropping funnel to initiate polymerization of aniline. The polymerization reaction was carried out while cooling the flask constantly at 5° C. and the stirring was stopped after 10 hours. After removing a large amount of precipitate produced in the reaction solution by filtration, the reaction solution was transferred into a separating funnel. Of the two layers obtained, the water layer was discharged and the toluene organic layer was washed twice with ion-exchanged water and twice with 1 N hydrochloric acid aqueous solution. Volatile components (organic solvent) were evaporated from the toluene solution under reduced pressure to confirm that no toluene soluble components were obtained.

Thus, a polyaniline complex soluble in toluene could not be obtained when (±) camphorsulfonic acid was used.

INDUSTRIAL APPLICABILITY

Since the conductive polyaniline composition of the invention can be formed into a molded product with excellent electric characteristics, the conductive polyaniline composition can be used in various fields, particularly in the fields of power-electronics and opto-electronics as an electrostatic and antistatic material, electromagnetic shielding film and material, transparent electrode and conductive film and material, material of electroluminescence device, circuit material; dielectric, electrolyte, and cathode of capacitors; electrode material of a solar cell or secondary battery, fuel-cell separator, electrolyte membrane material, thermoelectric conversion material, and the like.

The invention claimed is:

1. A conductive polyaniline composition comprising:
   (a) a substituted or unsubstituted polyaniline complex pronated by a sulfosuccinate represented by the following formula (III),

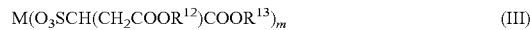

$$M(O_3SCH(CH_2COOR^{12})COOR^{13})_m \qquad (III)$$

wherein M is a hydrogen atom, or an organic or inorganic free radical;
   $R^{12}$ and $R^{13}$ are independently a hydrocarbon group or —$(R^{14}O)_r$—$R^{15}$, wherein $R^{14}$ is a hydrocarbon group or silylene group, $R^{15}$ is a hydrogen atom, hydrocarbon group, or $R^{16}_3Si$—, wherein $R^{16}$ is a hydrocarbon group and each occurrence may be the same or different, and r is an integer of 1 or more; and
   m is a valence of M, and
   (b) a compound having a phenolic hydroxyl group,
   wherein (a) and (b) are dissolved in an organic solvent substantially immiscible with water.

2. The conductive polyaniline composition according to claim 1, wherein the substituted or unsubstituted polyaniline has a weight average molecular weight of 100,000 g/mol or more.

3. The conductive polyaniline composition according to claim 1, wherein the molar concentration of the compound (b) having a phenolic hydroxyl group in the total solution of the composition is 0.01 mol/l to 5 mol/l.

4. The conductive polyaniline composition according to claim 1, wherein the concentration of the protonated substituted or unsubstituted polyaniline complex (a) relative to the organic solvent is 0.01 to 300 g/l.

5. The conductive polyaniline composition according to claim 1, wherein the content of a substituted or unsubstituted polyaniline relative to the protonated substituted or unsubstituted polyaniline complex (a) is 20 wt % to 70 wt %.

6. The conductive polyaniline composition according to claim 1, wherein the protonated substituted or unsubstituted polyaniline complex (a) is obtained by chemical-oxidation polymerizing a substituted or unsubstituted aniline which contains the protonic acid or salt thereof represented by the formula (III).

7. The conductive polyaniline composition according to claim 1, wherein the protonated substituted or unsubstituted polyaniline complex (a) is obtained by chemical-oxidation polymerizing a substituted or unsubstituted aniline in a two-phase system of an aqueous solution and an organic solvent substantially immiscible with water to produce a protonated substituted or unsubstituted polyaniline complex soluble in the organic solvent substantially immiscible with water, the system comprising the sulfosuccinate represented by formula (III).

8. The conductive polyaniline composition according to claim 1, wherein the compound (b) having a phenolic hydroxyl group is selected from the group consisting of phenol, o-cresol, m-cresol, p-cresol, catechol, resorcinol, chlorophenol, salicylic acid, hydroxybenzoic acid, hydroxynaphthalene, a phenol resin, polyphenol, and poly(hydroxystyrene).

9. The conductive polyaniline composition according to claim 1, wherein the organic solvent substantially immiscible with water is selected from the group consisting of a hydrocarbon solvent; a halogen-containing solvent; and an ester solvent.

10. The conductive polyaniline composition according to claim 9, wherein the organic solvent substantially immiscible with water is a hydrocarbon solvent selected from the group consisting of benzene, toluene, xylene, ethylbenzene, and tetralin.

11. The conductive polyaniline composition according to claim 9, wherein the organic solvent substantially immiscible with water is a halogen-containing solvent selected from the group consisting of methylene chloride, chloroform, carbon tetrachloride, dichloroethane, trichloroethane, and tetrachloroethane.

12. The conductive polyaniline composition according to claim 9, wherein the organic solvent substantially immiscible with water is an ester solvent which is ethyl acetate.

13. A conductive molded article comprising the conductive polyaniline composition according to claim 1.

14. The conductive molded article according to claim 13 whose inherent conductivity is at least 50 S/cm.

15. A surface-electric-conductive product obtained by applying to a substrate the conductive polyaniline composition according to claim 1.

16. The surface-electric-conductive product according to claim 15 whose specific surface resistance is at most $10^5$ Ω.

17. The surface-electric-conductive product according to claim 16 whose light transmission is 70% or more at 450 nm.

18. A method for producing a surface-electric-conductive product comprising:
   applying to a substrate the conductive polyaniline composition according to claim 1, and
   forming the applied substrate.

19. A method for producing a protonated substituted or unsubstituted polyaniline, comprising chemical-oxidation polymerizing a substituted or unsubstituted aniline in a two-phase system of an aqueous solution and an organic solvent substantially immiscible with water to produce a protonated substituted or unsubstituted polyaniline complex soluble in the organic solvent substantially immiscible with water, the system comprising a sulfosuccinate represented by the following formula (III), $$M(O_3SCH(CH_2COOR^{12})COOR^{13})_m \quad (III)$$

wherein M is a hydrogen atom, or an organic or inorganic free radical;

$R^{12}$ and $R^{13}$ are independently a hydrocarbon group or $-(R^{14}O)_r-R^{15}$, wherein $R^{14}$ is a hydrocarbon group or silylene group, $R^{15}$ is a hydrogen atom, hydrocarbon group, or $R^{16}_3Si-$, wherein $R^{16}$ is a hydrocarbon group and each occurrence may be the same or different, and r is an integer of 1 or more; and m is a valence of M.

20. A method for producing a conductive polyaniline composition comprising:
   (i) chemical-oxidation polymerizing a substituted or unsubstituted aniline in an organic solvent substantially immiscible with water in the presence of an organic protonic acid or a salt thereof represented by the following formula (III) to produce a protonated substituted or unsubstituted polyaniline complex (a) soluble in the organic solvent, $$M(O_3SCH(CH_2COOR^{12})COOR^{13})_m \quad (III)$$

wherein M is a hydrogen atom, or an organic or inorganic free radical;

$R^{12}$ and $R^{13}$ are independently a hydrocarbon group or $-(R^{14}O)_r-R^{15}$, wherein $R^{14}$ is a hydrocarbon group or silylene group, $R^{15}$ is a hydrogen atom, hydrocarbon group, or $R^{16}_3Si-$, wherein $R^{16}$ is a hydrocarbon group and each occurrence may be the same or different, and r is an integer of 1 or more; and m is a valence of M; and (ii) adding a compound (b) having a phenolic hydroxyl group into the protonated substituted or unsubstituted polyaniline complex (a) dissolved in the organic solvent substantially immiscible with water.

* * * * *